(12) United States Patent
Kudo et al.

(10) Patent No.: US 11,916,612 B2
(45) Date of Patent: Feb. 27, 2024

(54) MOBILE TERMINAL AND COMMUNICATION QUALITY PREDICTION METHOD

(71) Applicant: NIPPON TELEGRAPH AND TELEPHONE CORPORATION, Tokyo (JP)

(72) Inventors: Riichi Kudo, Musashino (JP); Kahoko Takahashi, Musashino (JP); Kohei Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 22 days.

(21) Appl. No.: 17/764,364

(22) PCT Filed: Oct. 1, 2019

(86) PCT No.: PCT/JP2019/038691
§ 371 (c)(1),
(2) Date: Mar. 28, 2022

(87) PCT Pub. No.: WO2021/064848
PCT Pub. Date: Apr. 8, 2021

(65) Prior Publication Data
US 2022/0337329 A1    Oct. 20, 2022

(51) Int. Cl.
*H04W 72/00* (2023.01)
*H04B 17/391* (2015.01)
(Continued)

(52) U.S. Cl.
CPC ....... *H04B 17/3913* (2015.01); *H04B 1/3827* (2013.01); *H04B 17/26* (2015.01)

(58) Field of Classification Search
CPC .. H04B 17/3913; H04B 1/3827; H04B 17/26; H04M 1/00; H04W 24/00
See application file for complete search history.

(56) References Cited

U.S. PATENT DOCUMENTS

| | | | |
|---|---|---|---|
| 9,721,150 B2 * | 8/2017 | Gottemukkula | G06V 40/168 |
| 11,238,340 B1 * | 2/2022 | Anderson | G06N 3/02 |
| 11,397,258 B2 * | 7/2022 | Zeng | G01S 7/415 |

FOREIGN PATENT DOCUMENTS

| | | |
|---|---|---|
| JP | 2012160900 A | 8/2012 |
| JP | 201734635 A | 2/2017 |

(Continued)

OTHER PUBLICATIONS

Hironao Okamoto et al., Realtime Throughput Estimation Using Depth Images for mmWave Communications, IEICE Technical Report, vol. 116, No. 276, 2016 (Year: 2016).*

(Continued)

*Primary Examiner* — Lan-Huong Truong
(74) *Attorney, Agent, or Firm* — Harness, Dickey & Pierce, P.L.C.

(57) ABSTRACT

An object of the present invention is to provide a mobile terminal capable of predicting fluctuation in communication quality. The mobile terminal according to the present invention uses terminal information consisting of position/orientation/speed/component operation/control command information/camera information/sensor information, and the like of the mobile terminal to model a relationship with communication quality and predict the communication quality using the obtained communication quality prediction model. When fluctuations in communication quality can be predicted, it is possible to cope with the fluctuations (especially deterioration) in communication quality in advance (for example, to change a communication destination station, to decrease a data rate in an application, or to change a control mode of a terminal to a safer mode, by knowing in advance deterioration in quality of a radio signal).

5 Claims, 11 Drawing Sheets

(51) Int. Cl.
   *H04B 17/26*   (2015.01)
   *H04B 1/3827*  (2015.01)

(56) References Cited

FOREIGN PATENT DOCUMENTS

| JP | 201826728 A | * | 2/2018 |
|----|-------------|---|--------|
| JP | 201832939 A |   | 3/2018 |

OTHER PUBLICATIONS

Hironao Okamoto et al., Machine-learning-based throughput estimation using images for mmWave communications, Proc., IEEE VTC 2017—spring, Jun. 4, 2017.
Hironao Okamoto et al., Realtime Throughput Estimation Using Depth Images for mmWave Communications, IEICE Technical Report, vol. 116, No. 276, 2016.

* cited by examiner

Fig. 10

TABLE 1. CHANGE IN DECISION COEFFICIENT FOR INPUT FEATURE QUANTITIES

| COMBINATION OF FEATURE QUANTITIES | NUMBER OF FEATURE QUANTITIES | DECISION COEFFICIENT |
|---|---|---|
| ALL FEATURE QUANTITIES[POSITION/ORIENTATION/ SPEED/CONTROL INFORMATION SET, PLAN INFORMATION SET, COMMUNICATION INFORMATION SET] | 96 | 0.788 |
| POSITION/ORIENTATION/SPEED/CONTROL INFORMATION SET AND COMMUNICATION INFORMATION SET (NO PLAN INFORMATION) | 86 | 0.785 |
| POSITION/DORIENTATION/SPEED/CONTROL INFORMATION SET ONLY | 64 | 0.692 |
| COMMUNICATION INFORMATION SET | 12 | 0.671 |

MOBILE TERMINAL AND COMMUNICATION QUALITY PREDICTION METHOD

CROSS-REFERENCE TO RELATED APPLICATIONS

This application is a 371 U.S. National Phase of International Application No. PCT/JP2019/038691, filed on Oct. 1, 2019. The entire disclosure of the above application is incorporated herein by reference.

TECHNICAL FIELD

The present disclosure relates to prediction of communication quality using apparatus information of a mobile terminal.

BACKGROUND ART

Realization of Internet of things (IoT) in which various devices are connected to the Internet is progressing, and various devices such as automobiles, drones, and construction machinery vehicles are connected wirelessly. As wireless communication standards, supporting wireless standards such as wireless local area network (LAN) defined by the standardization standard IEEE802.11, Bluetooth (trade name), cellular communication by LTE or 5G, low power wide area (LPWA) communication for IoT, electronic toll collection system (ETC) used for car communication, vehicle information and communication system (VICS (trade name)), and ARIB-STD-T109 have also been developed and are expected to become widespread in the future.

However, while wireless communication is used for various purposes, there is a problem that wireless communication cannot always meet requirements for communication quality depending on services. In particular, an orientation of directivity of an antenna or a propagation environment inevitably changes due to movement of a communication apparatus, which affects communication quality.

CITATION LIST

Non Patent Literature

NPL 1: H. Okamoto, et al., "Machine-learning-based throughput estimation using images for mmWave communications," inProc., IEEE VTC 2017-spring, January 2017.

SUMMARY OF THE INVENTION

Technical Problem

A wireless communication function is installed in automobiles, drones, construction machinery vehicles, robots, and other devices. Further, for communication of such devices, there may be throughput, delay, continuity, stability, and other communication quality requirements. In such a case, communication quality fluctuates depending on a terminal state such as a position, posture, and movement of a terminal having the wireless communication function, which may have a great influence on a service provided by a device or a system. That is, a terminal having a wireless communication function has a problem that it is necessary to take measures against fluctuations in communication quality depending on a state of the terminal.

Thus, in view of the above problems, an object of the present invention is to provide a mobile terminal and a communication quality prediction method capable of predicting fluctuations in communication quality.

Means for Solving the Problem

In order to achieve the above object, the mobile terminal according to the present invention uses terminal information consisting of position/orientation/speed/component operation/control command information/camera information/sensor information and the like of the mobile terminal to model a relationship with communication quality and predict the communication quality using the obtained communication quality prediction model.

Specifically, the mobile terminal according to the present invention is a mobile terminal that performs wireless communication, and includes:

a terminal information generation unit configured to generate terminal information consisting of at least one or more of a position, a posture, a motion, control information, camera and sensor information, and past communication information of the mobile terminal; and a communication prediction unit configured to use a communication quality model generated by learning a relationship between communication quality of the wireless communication and the terminal information to estimate current or future communication quality from current terminal information.

Further, a communication quality prediction method according to the present invention includes: generating terminal information consisting of at least one or more of a position, a posture, a motion, control information, camera and sensor information, and past communication information of the mobile terminal; and using a communication quality model generated by learning a relationship between communication quality of the wireless communication and the terminal information to estimate current or future communication quality from current terminal information.

The terminal information includes at least a control plan corresponding to a future operation of the mobile terminal. Further, the terminal information further includes information on an orientation of the mobile terminal, and a sine component and a cosine component of an angle are used as the orientation information.

The mobile terminal according to the present invention predicts the current or future communication quality from the acquired terminal information. Thus, the present invention can provide a mobile terminal and a communication quality prediction method capable of predicting fluctuations in communication quality. When fluctuations in communication quality can be predicted, it is possible to cope with the fluctuations (especially deterioration) in communication quality in advance (for example, to change a communication destination station, to decrease a data rate in an application, or to change a control mode of a terminal to a safer mode, by knowing in advance deterioration in quality of a radio signal). In particular, when the future (milliseconds in the future rather than microseconds or several seconds in the future rather than milliseconds) is predicted, it is possible to perform more advanced coping due to an increase in options for coping with a change in communication quality (for example, when it takes one second to make a wireless line redundant and add a new line, coping cannot be performed unless one second in the future is predicted in implementing the coping).

The communication quality model may be introduced from the outside or may be generated by the mobile terminal itself. That is, the mobile terminal according to the present invention further includes a communication quality evaluation unit configured to evaluate the communication quality to generate communication quality information together with corresponding time information; and a communication quality learning unit configured to learn a relationship between the communication quality and the terminal information to generate the communication quality model, wherein the terminal information generation unit generates the terminal information together with the corresponding time information.

Because the predicted communication quality is only predicted, the predicted communication quality may deviate from actually measured communication quality. Thus, the communication prediction unit uses a prediction deviation model generated by learning a relationship between an error between the communication quality evaluated by the communication quality evaluation unit and the communication quality estimated by the communication prediction unit, and the terminal information to estimate a current or future error from current terminal information. The mobile terminal according to the present invention can also predict a deviation in communication quality predicted from the acquired terminal information.

The prediction deviation model may be introduced from the outside, or may be generated by the mobile terminal itself. The mobile terminal according to the present invention further includes a prediction deviation learning unit configured to learn the relationship between the error and the terminal information to generate the prediction deviation model, wherein the communication quality evaluation unit measures the error.

Effects of the Invention

According to the present invention, terminal information including at least some of position/orientation/speed/component operation/control command information/camera information/sensor information generated in the terminal is used for modeling of a relationship with the communication quality measured between the terminal and an external communication apparatus through machine learning, and prediction of the communication quality from the terminal information using the obtained communication quality prediction model, thereby improving prediction accuracy of the communication quality.
Thus, the present invention can provide a mobile terminal and a communication quality prediction method capable of predicting fluctuations in communication quality.

BRIEF DESCRIPTION OF DRAWINGS

FIG. 10 is a diagram illustrating effects of the mobile terminal according to the present invention.

DESCRIPTION OF EMBODIMENTS

Embodiments of the present invention will be described with reference to the accompanying drawings. Embodiments to be described hereinafter are examples of the present invention, and the present invention is not limited to the following embodiments. Components having the same reference signs in the present specification and the drawings indicate the same components.

Figure 3:
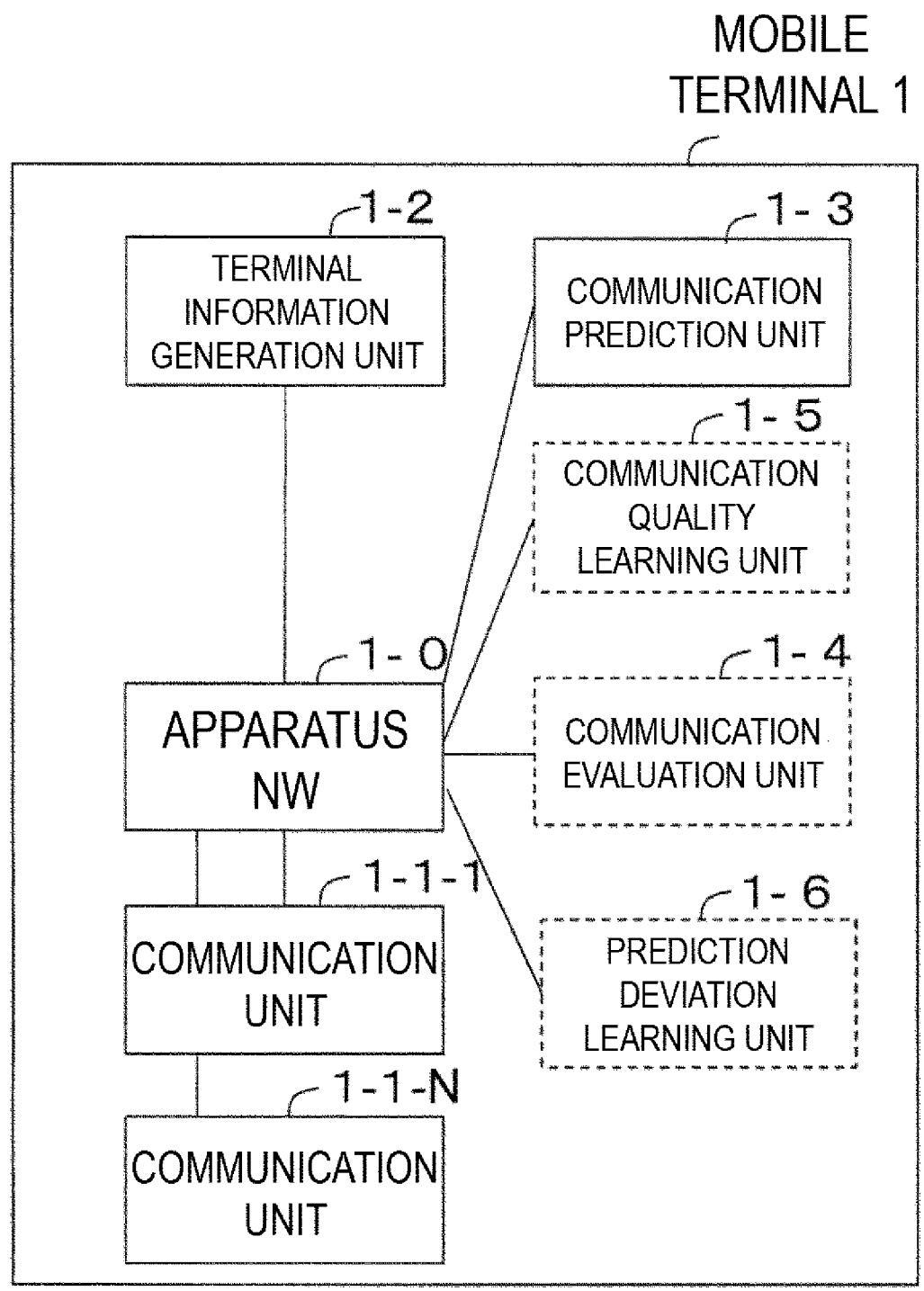
FIG. 3 is a diagram illustrating a configuration of the mobile terminal according to the present invention.

FIG. 3 is a configuration diagram illustrating a mobile terminal 1 of the present embodiment. The mobile terminal 1 is a mobile terminal that performs wireless communication, and includes a terminal information generation unit 1-2 that generates terminal information consisting of at least one or more of a position, posture, motion, control information, camera and sensor information, and past communication information of the mobile terminal 1, and a communication prediction unit 1-3 that uses a communication quality model generated by learning a relationship between communication quality of the wireless communication and the terminal information to estimate current or future communication quality from current terminal information.

The mobile terminal 1 is hardware capable of control of movement of the mobile terminal 1, at least an operation of a part of the mobile terminal 1, and the like, and control of components of the mobile terminal. For example, the mobile terminal 1 is an automobile, a large mobile vehicle, a small mobile vehicle, a mining or construction machine, a flying vehicle such as a drone, a two-wheeled vehicle, a wheelchair, or a robot.

The mobile terminal 1 may further include a communication quality evaluation unit 1-4 that evaluates the communication quality and generates communication quality information together with time information corresponding to the communication quality, and
   a communication quality learning unit 1-5 that learns a relationship between the communication quality and the terminal information to generate the communication quality model.
Further, the terminal information generation unit generates the terminal information together with the corresponding time information.

Figure 1:
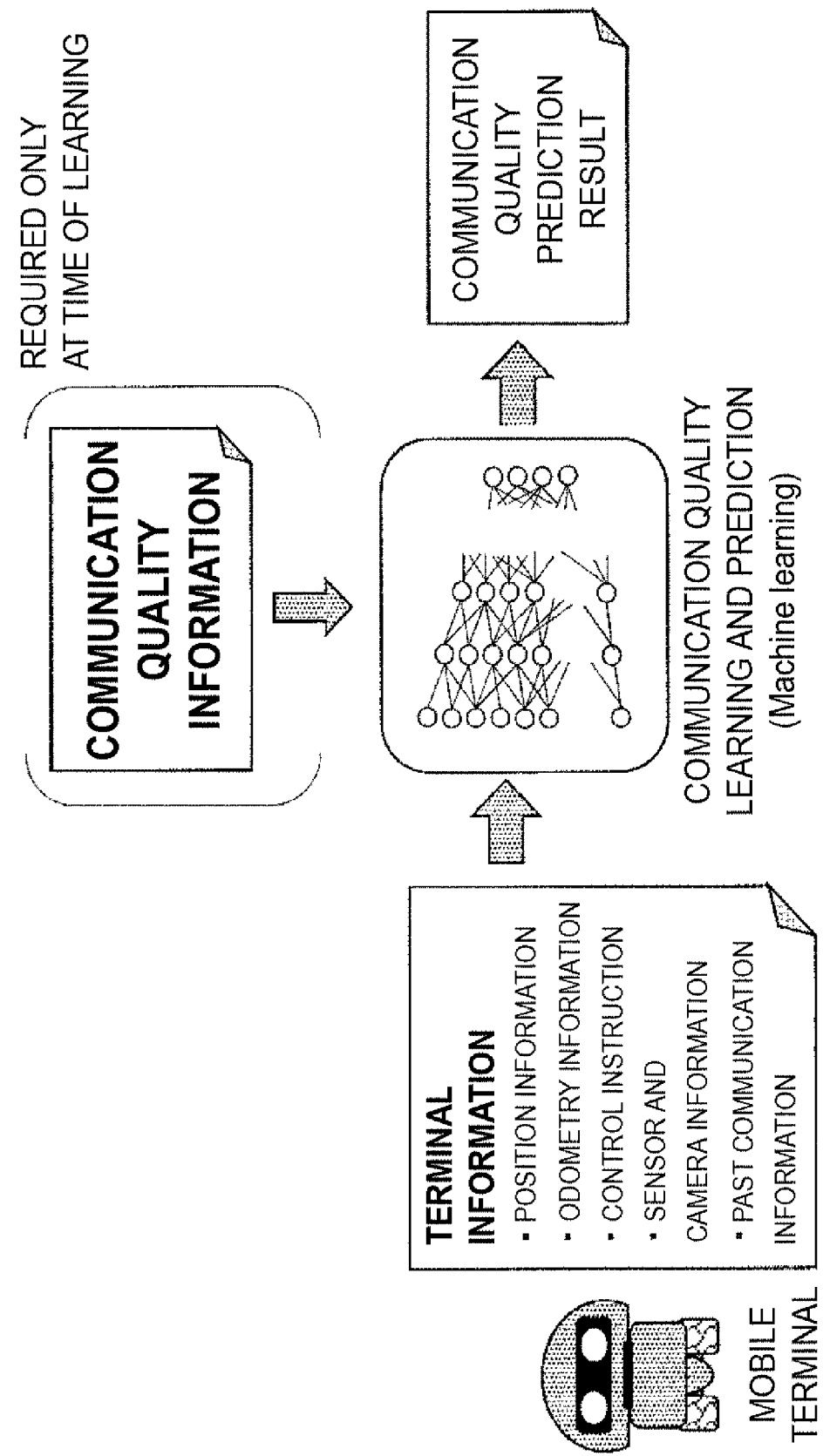
FIG. 1 is a diagram illustrating a scheme by which a mobile terminal according to the present invention predicts future communication quality.

FIG. 1 illustrates an overview of first communication quality prediction that is performed by the mobile terminal 1. In this embodiment, the terminal information generation unit 1-2 of the mobile terminal 1 generates terminal information including at least some of position/orientation/speed/ component operation/control information/camera information/sensor information/past communication information. For control command information to be used as the terminal information, a future plan of control command information that has not yet been output to a motor or the like in order to control the mobile terminal 1 may be input. Further, the camera information and the sensor information to be used as the terminal information are object information such as data for each of pixels of an image, point cloud data of light detection and ranging (LIDAR), or position information that is obtained as a result of performing object recognition based on deep learning or the like from the image or the point cloud data. Here, the control information corresponds to ON/OFF information of a specific function, command information for controlling a motion of the mobile terminal or a part thereof, a signal emitted by a circuit of the mobile terminal, and the like.

The communication quality evaluation unit 1-4 installed in the mobile terminal 1 or in an external area in which a connection can be made by communication generates communication quality information.

A relationship between the terminal information and the communication quality information is machine-learned and modeled by the communication quality learning unit 1-5 installed in the mobile terminal 1 or in an external area in which a connection can be made by communication. As a machine learning algorithm, a machine learning algorithm such as a support vector machine, a multi-layer perceptron, a k-neighborhood method, or a random forest, a deep learning algorithm such as a recurrent neural network (RNN), a convolutional neural network (CNN), or a long short term memory (LSTM), or a method such as a bagging method that is a combination of these can be used.

The communication prediction unit 1-3 uses the communication quality prediction model obtained by machine learning to estimate the communication quality from the terminal information, and outputs the communication quality.

The communication prediction unit 1-3 can use a prediction deviation model generated by learning a relationship between an error between the communication quality evaluated by the communication quality evaluation unit 1-4 and the communication quality estimated by the communication prediction unit 1-3, and the terminal information 1 to estimate a current or future error from current terminal information.

The mobile terminal 1 may further include a prediction deviation learning unit 1-6 that learns the relationship between the error and the terminal information to generate the prediction deviation model, and the communication quality evaluation unit 1-4 may measure the error.

Figure 2:
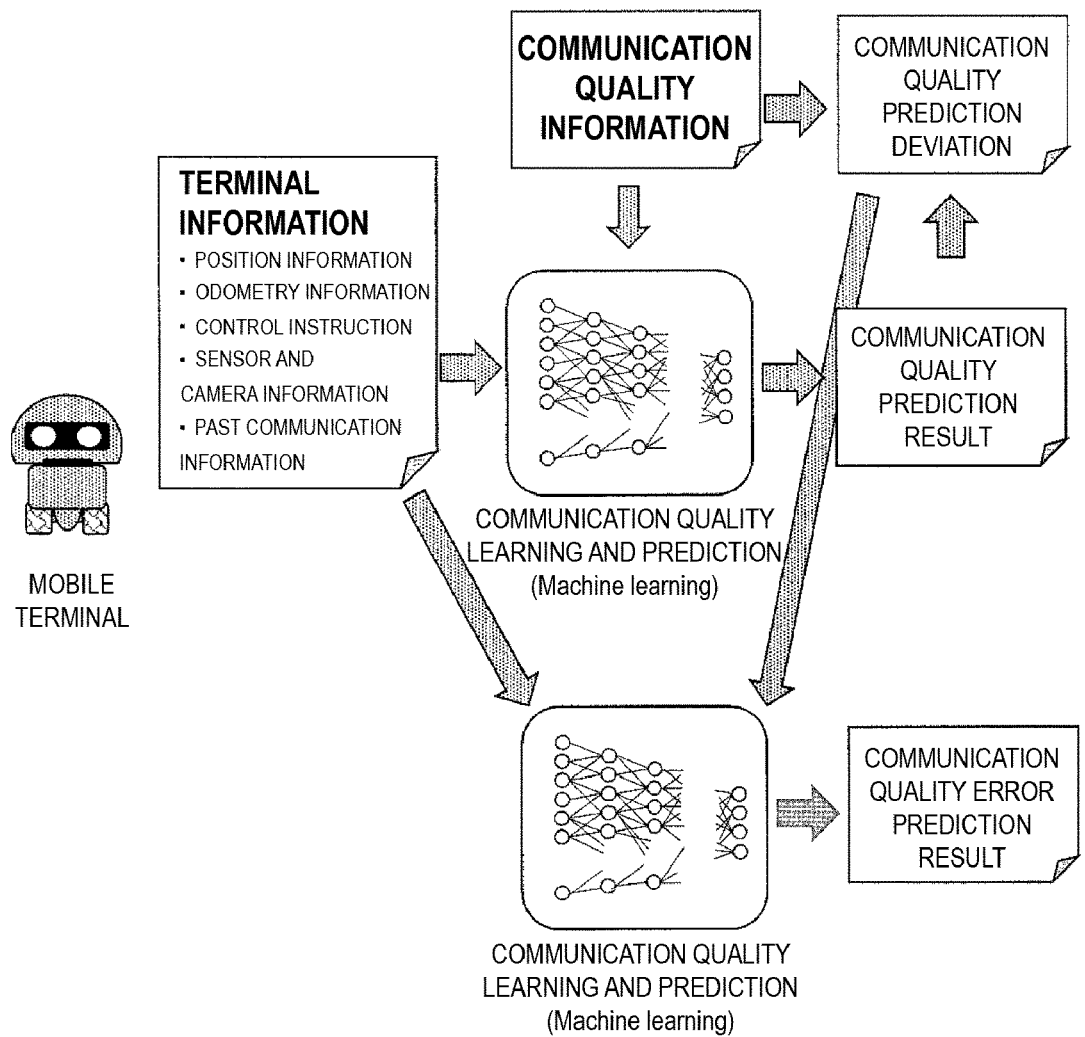
FIG. 2 is a diagram illustrating a scheme by which the mobile terminal according to the present invention predicts a deviation in future communication quality.

FIG. 2 illustrates an overview of second communication quality prediction that is performed by the mobile terminal 1. Similarly, in this form, the terminal information generation unit 1-2 of the mobile terminal 1 generates terminal information including at least some of position/orientation/speed/component operation/control information/camera information/sensor information/past communication information.

The communication quality evaluation unit 1-4 installed in the mobile terminal 1 or in an external area in which a connection can be made by communication generates the communication quality information. The relationship between the terminal information and the communication quality information is machine-learned and modeled by the communication quality learning unit 1-5 installed in the mobile terminal 1 or in an external area in which a connection can be made by communication. The communication prediction unit 1-3 uses this communication quality prediction model to estimate the communication quality from the terminal information, and outputs the communication quality.

Further, in the second communication quality prediction, the communication quality evaluation unit 1-4 compares the communication quality information predicted by the communication prediction unit 1-3 with the actual communication quality measured by the communication quality evaluation unit 1-4 to generate the prediction deviation information (error). The prediction deviation learning unit 1-6 installed in the mobile terminal 1 or in an external area in which a connection can be made by communication performs machine learning on a relationship between the obtained prediction deviation information and the terminal information used for communication quality prediction, and performs modeling thereon. As the machine learning algorithm, the same algorithm as that of the communication quality learning unit 1-5 is exemplified.

The communication prediction unit 1-3 uses the prediction deviation model obtained by machine learning to output predicted communication quality deviation predicted from the terminal information.

In this form, not only the communication quality information but also the prediction deviation information can be output from the terminal information. The following are examples of use of the prediction deviation.

(Example 1) Reliability of a predicted value is lowered, a prediction result of the communication quality is lowered by a coefficient corresponding to the prediction deviation, and a probability of predicted communication quality exceeding actual communication quality is lowered for evaluation.

(Example 2) Under a condition that the prediction deviation is large, the communication quality prediction is regarded as impossible and output is not performed.

(Example 3) Causes of deterioration in communication quality prediction are clarified from a feature quantity highly relevant to the prediction deviation.

Here, the feature quantity is information that is used when the communication quality is predicted by machine learning.

Here, the communication quality is received signal power, a signal to noise power ratio, a signal to interference noise power ratio, a received signal strength indication (RSSI), received signal reference quality (RSRQ), a packet error rate, the number of arrival bits, the number of arrival bits per unit time, a modular code index, the number of retransmissions, a delay time, differential information of values thereof, and an index calculated from the values using a calculation equation. Further, communication quality measured in the past can be stored in the terminal information generation unit 1-2 and used as the terminal information.

The mobile terminal 1 in FIG. 3 includes
a communication unit 1-1-$j$ ($j$ is an integer from 1 to N and N is the number of communication units) that can perform wireless communication with a communication apparatus,
the terminal information generation unit 1-2 that generates position/orientation/speed/component operation/control information/camera information/sensor information/past communication information of the mobile terminal 1, and
the communication prediction unit 1-3 that acquires the terminal information generated by the terminal information generation unit using a learned communication quality prediction model via a apparatus NW1-0 and outputs communication quality information.

The communication unit 1-1-*j* can use a wireless LAN defined by IEEE802.11, Wigig (trade name), IEEE802.11p, a communication standard for ITS, wireless communication defined by 3GPP such as LTE or 5G, wide area wireless communication such as low power wide area (LPWA), or a communication using sound waves, electricity, or light.

Communication quality information of wireless communication performed between the communication unit 1-1-*j* and an external communication apparatus is generated in a communication evaluation unit 1-4 included in the mobile terminal 1 or in an external area in which communication can be performed via the communication unit.

The communication quality information is input to the communication quality learning unit 1-5 included in the mobile terminal 1 or in an external area in which communication can be performed via the communication unit. The communication quality learning unit 1-5 learns the relationship between the terminal information and the communication quality information through machine learning to obtain a communication quality prediction model. The communication quality prediction model is implemented in the communication prediction unit 1-3.

Further, in the embodiment related to the second communication quality prediction described above, the prediction deviation learning unit 1-6 is included in the mobile terminal 1 or an external area in which communication can be performed via the communication unit 1-1-*j*. The communication quality information estimated by the communication prediction unit 1-3 is input to the communication quality evaluation unit 1-4. The communication quality evaluation unit 1-4 outputs the prediction deviation (error) obtained by comparing the input communication quality information with the communication quality information actually measured at the same timing to the prediction deviation learning unit 1-6.

Further, the terminal information generation unit 1-2 outputs the terminal information to the prediction deviation learning unit 1-6. The prediction deviation learning unit 1-6 learns a relationship between the terminal information and the prediction deviation through machine learning to obtain a prediction deviation model. The prediction deviation learning unit 1-6 outputs the obtained prediction deviation model to the communication prediction unit 1-3. The communication prediction unit 1-3 uses the communication quality prediction model and the prediction deviation model to estimate the communication quality information and the prediction deviation from the input terminal information, and output the communication quality information and the prediction deviation.

The terminal information input to the communication prediction unit 1-3, the communication quality learning unit 1-5, and the prediction deviation learning unit 1-6 may be subjected to filter processing such as performing dimension compression to reduce the number of parameters, performing calculation using terminal information as a new feature quantity, or satisfying a certain condition.

There are the following cases in the machine learning performed by the communication quality learning unit 1-5 and the prediction deviation learning unit 1-6.
  Case 1: The mobile terminal 1 performs the machine learning in a real environment while actually performing communication.
  Case 2: The machine learning is performed using data acquired by another terminal, or another terminal specially prepared for learning.
  Case 3: The machine learning is performed in a simulation space that simulates an environment as close as possible to a real environment in a real world.
  Case 4: An input and output relationship (model) subjected to machine learning in a simulation space or a similar external terminal is introduced.

It is also possible to limit conditions under which communication quality is to be predicted and improve the efficiency of learning and prediction. For example, some of the terminal information can be learned, predicted, or learned and predicted only under specific conditions. For example, a case in which position information satisfies a predetermined condition, a case in which a specific function is turned on from control information of the mobile terminal, a case in which data obtained from odometry information or position information exceeds a specific value, and the like can be considered.

The communication quality learning unit 1-5 outputs the communication quality prediction model learned in this way to the communication prediction unit 1-3.

On the other hand, the mobile terminal 1 can assume that an output of the communication prediction unit 1-3 is reliable and output the predicted communication quality information or perform setting so that the predicted communication quality information is used when the prediction deviation learning unit 1-6 outputs a value smaller than a predetermined prediction deviation indicator.

In order to reduce the complexity of a value of a target of estimation, a model may be constructed so that only communication quality deterioration is predicted. For example, it is also possible to perform the communication quality prediction when predetermined communication quality indicators (the number of bits per hour, the number of bits per time and frequency, packet loss, a packet loss rate, RSSI degradation, RSRQ degradation, a packet transmission rate, a degree of change in such parameters from normal times, and feature quantities extracted from such a plurality of parameters) satisfy a predetermined condition.

The communication quality learning unit 1-5, the prediction deviation learning unit 1-6, and the communication prediction unit 1-3 may perform learning and prediction on each of settings of communication regarding a frequency, a frequency band, and the like that are used in the communication unit 1-1-*j* or perform learning and prediction, including the settings of communication in the terminal information.

Figure 4:
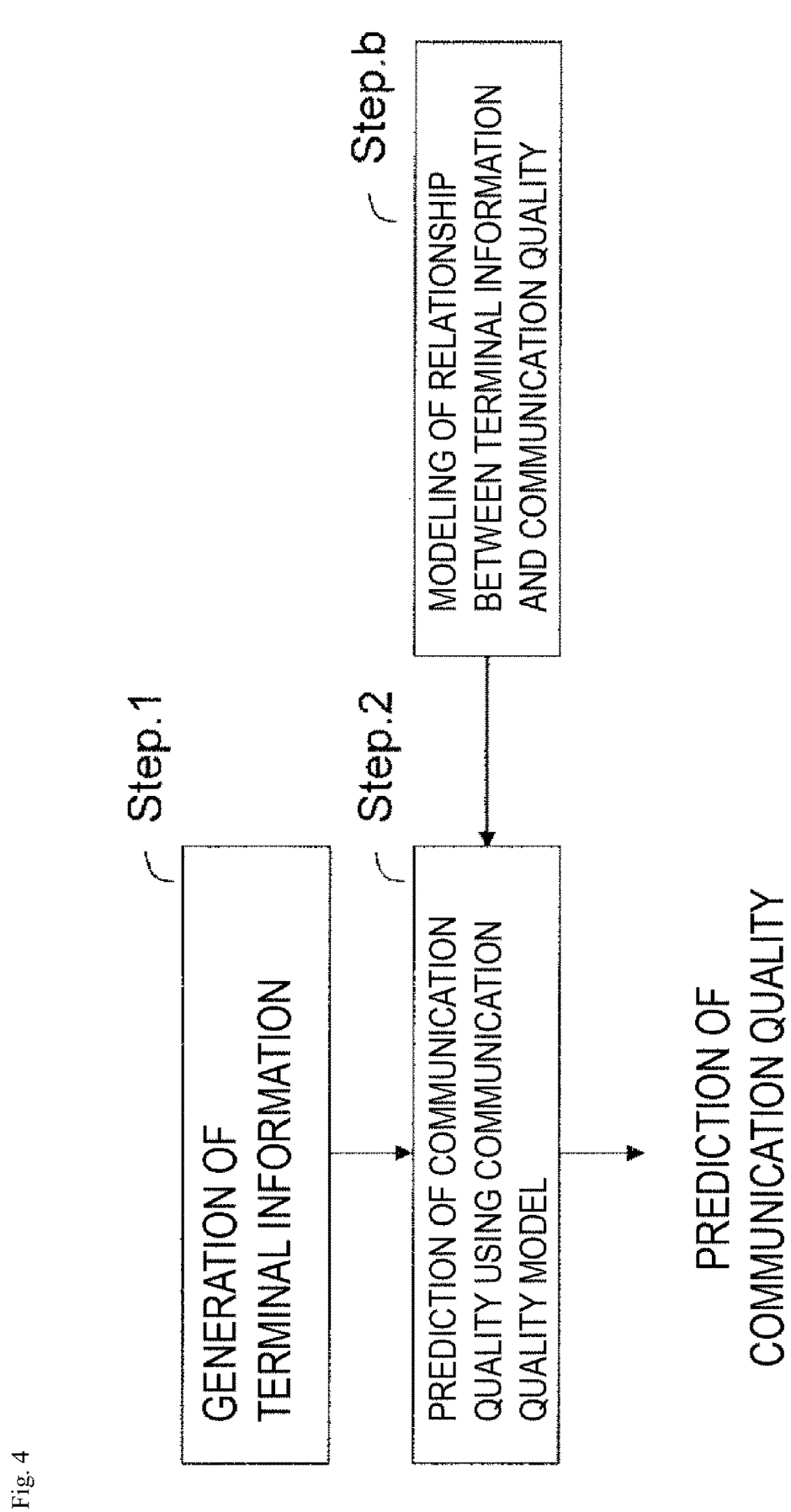
FIG. 4 is a diagram illustrating a communication quality prediction method for a mobile terminal according to the present invention.
Figure 5:
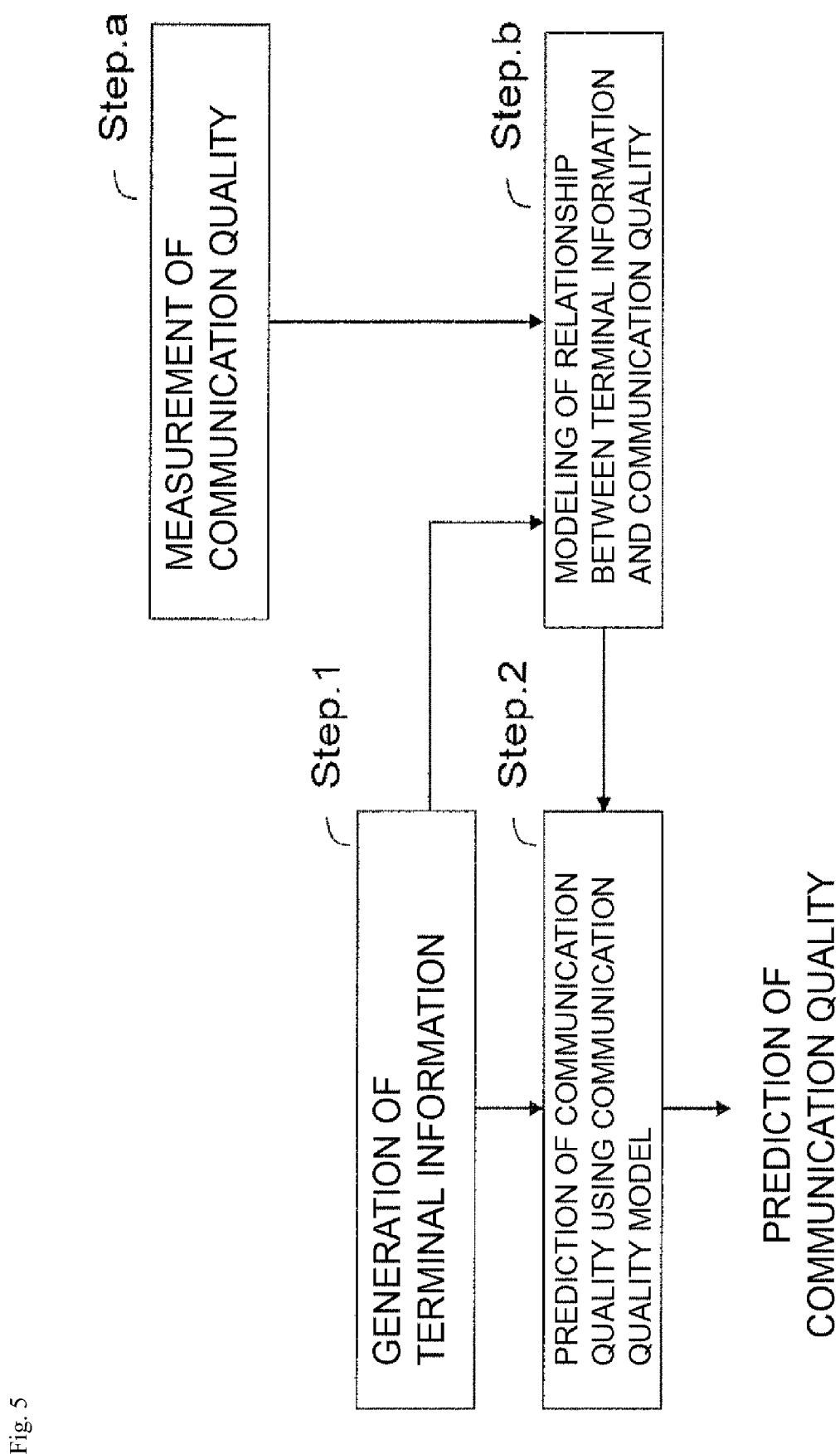
FIG. 5 is a diagram illustrating a communication quality prediction method for a mobile terminal according to the present invention.
Figure 6:
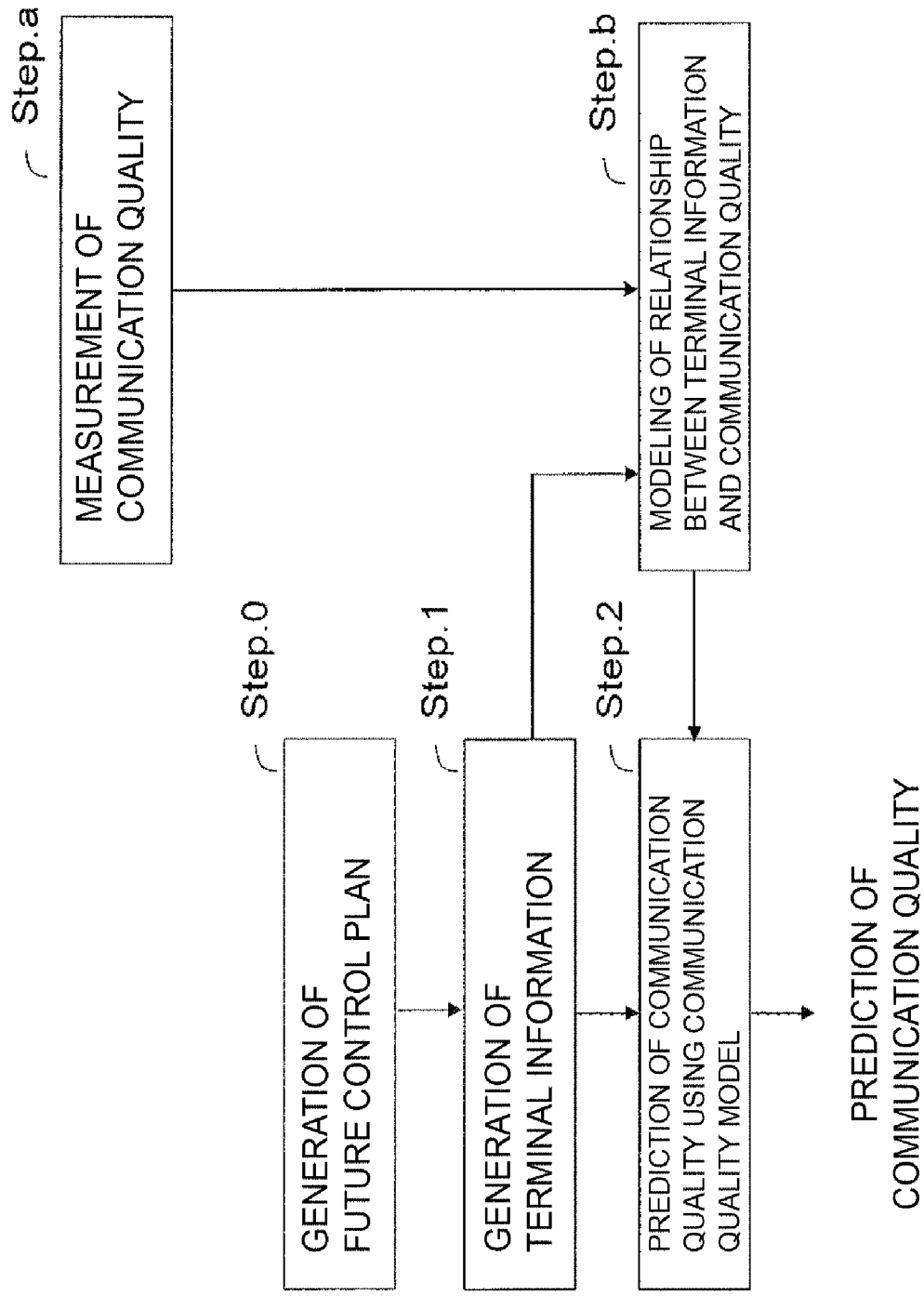
FIG. 6 is a diagram illustrating a communication quality prediction method for a mobile terminal according to the present invention.

FIGS. 4 to 6 are flowcharts illustrating a first communication quality prediction method. A flowchart of FIG. 4 is a flowchart illustrating a most basic communication quality prediction method.

The terminal information generation unit 1-2 generates terminal information and outputs the terminal information to the communication prediction unit 1-3 (step.1). The communication quality learning unit 1-5 models the relationship between the terminal information and the communication quality through machine learning to generate a communication quality prediction model, and outputs the communication quality prediction model to the communication prediction unit 1-3 (step.b). The communication prediction unit 1-3 predicts the communication quality from the terminal information input using the communication quality prediction model (step.2).

In a basic flow thereof, a relationship between the communication quality and the terminal information (communication quality prediction model) may be constructed by simulation, and in this case, the communication quality evaluation unit 1-4 mounted in the mobile terminal or a network may not always be used.

A flowchart of FIG. 5 is a flowchart illustrating a communication quality prediction method in which a step of measuring the communication quality using the communication evaluation unit 1-4 included in the mobile terminal 1 or an external network is added to the flowchart of FIG. 4.

The terminal information generation unit 1-2 generates the terminal information (step.1). The communication evaluation unit 1-4 measures communication quality of the mobile terminal 1 to generate communication quality information (step.a). The communication quality learning unit 1-5 models a relationship between the terminal information generated by the terminal information generation unit 1-2 and the communication quality generated by the communication evaluation unit 1-4 through machine learning to generate a communication quality prediction model, and outputs the communication quality prediction model to the communication prediction unit 1-3 (step.b). The communication prediction unit 1-3 uses the communication quality prediction model obtained in step.b to predict the communication quality from the input terminal information (step.2).

The flowchart of FIG. 6 is a flowchart illustrating a communication quality prediction method in which a step of including a future control plan in the terminal information is added to the flowchart of FIG. 5.

The terminal information generation unit 1-2 generates a command plan for controlling the mobile terminal 1 at a future time as part of the terminal information (step.0). The terminal information generation unit 1-2 generates terminal information including other information such as the command plan and position information. The terminal information is output to the communication evaluation unit 1-4 and the communication quality learning unit 1-5 (step.1). The communication evaluation unit 1-4 measures the communication quality of the mobile terminal 1 to generate communication quality information (step.a). The communication quality learning unit 1-5 models a relationship between the communication quality generated by the communication evaluation unit 1-4 and the terminal information including a command plan regarding future control through machine learning to generate a communication quality prediction model, and outputs the communication quality prediction model to the communication prediction unit 1-3 (step.b). In this case, for the position information, speed information, or the like, only the control command can be learned up to information corresponding to the future for a time corresponding to the command plan using past information from a time that has been determined from a time of the measured communication quality in advance. The communication prediction unit 1-3 uses the communication quality prediction model obtained in step.b to predict the communication quality from the input terminal information (step.2).

Figure 7:
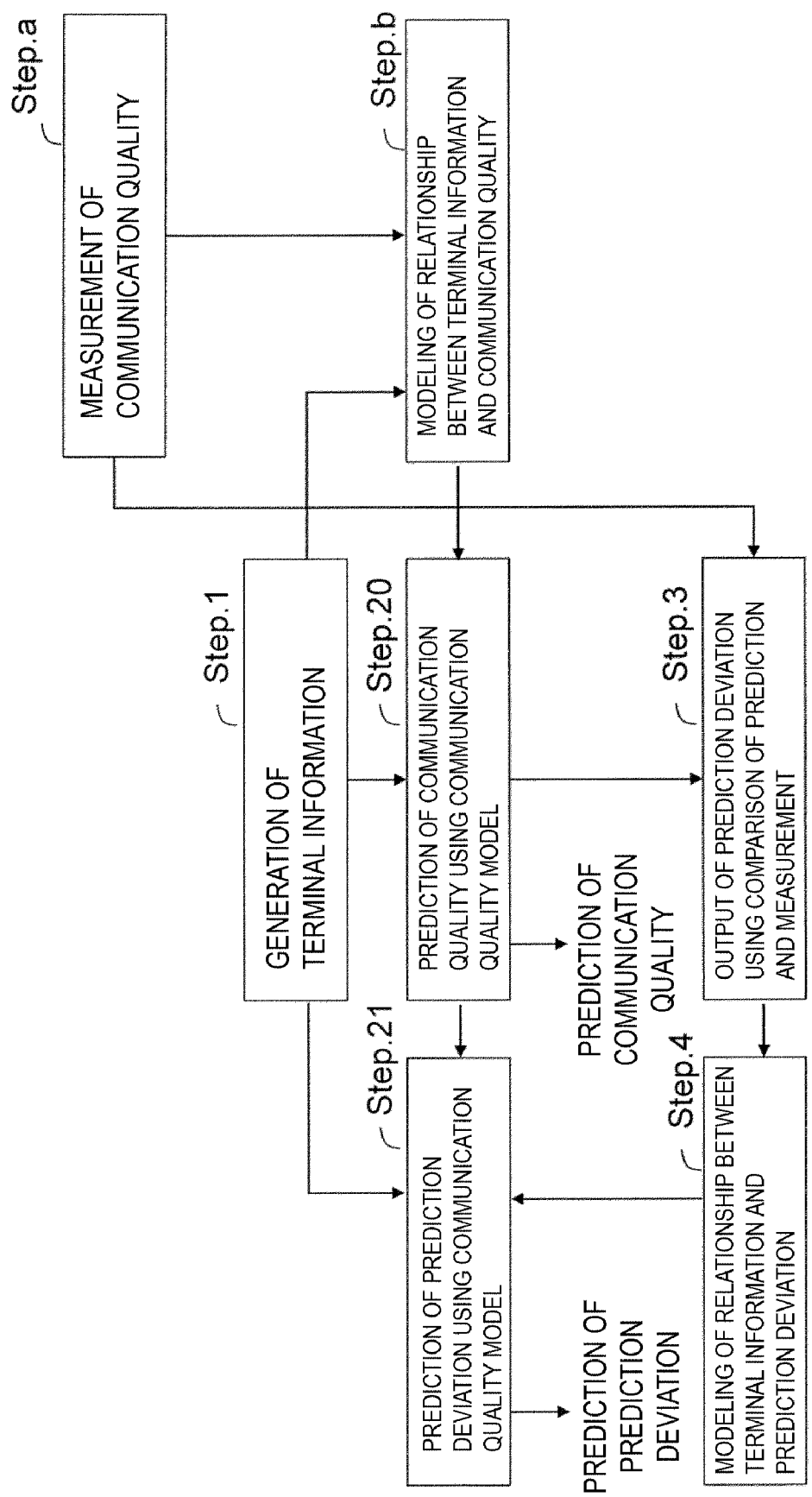
FIG. 7 is a diagram illustrating a communication quality prediction method for a mobile terminal according to the present invention.

FIG. 7 is a flowchart illustrating a second communication quality prediction method. The terminal information generation unit 1-2 generates terminal information (step.1). The communication evaluation unit 1-4 measures the communication quality of the mobile terminal 1 to generate communication quality information (step.a). The communication quality information is output to each of the prediction deviation evaluation unit 1-6 and the communication quality learning unit 1-5. The communication quality learning unit 1-5 models a relationship between the terminal information generated by the terminal information generation unit 1-2 and the communication quality generated by the communication evaluation unit 1-4 through machine learning to generate a communication quality prediction model, and outputs the communication quality prediction model to the communication prediction unit 1-3 (step.b). The communication prediction unit 1-3 uses the communication quality prediction model obtained in step.b to predict the communication quality from the input terminal information (step.20). Further, the communication prediction unit 1-3 uses the prediction deviation model described above to predict the prediction deviation of the communication quality (step.21). The prediction deviation learning unit 1-6 measures a deviation (prediction deviation) between a predicted value of the communication quality generated by the communication prediction unit 1-3 and an actually measured value of the communication quality measured by the communication evaluation unit 1-4 (step.3). Further, the prediction deviation learning unit 1-6 models a relationship between the prediction deviation and the terminal information through machine learning to generate a prediction deviation model, and outputs the prediction deviation model to the quality prediction unit 1-3 (step.4).

An experiment performed to demonstrate the effects of the present invention and results thereof will be described with reference to FIGS. 8 to 9. The mobile terminal 1 used in the demonstration experiment is an autonomous mobile robot having LIDAR mounted therein, and can collect self-position information (an X coordinate and a Y coordinate) on a two-dimensional map, orientation information (two pieces of rotation information in a quaternion; sin (θ/2) and cos (θ/2) with respect to an orientation θ on the two-dimensional map), speed information (difference information of the X coordinate and the Y coordinate, an amount of movement in a coordinate system based on a front of the mobile terminal estimated from an amount of movement of tires observed by the mobile terminal, and a value obtained by converting the amount of movement into an amount of movement on the two-dimensional map using the above-described orientation information), and control command information (a signal for instructing the tires of the mobile terminal to perform an operation and a future operation command signal), as terminal information. When angle information is used as the orientation information, inconsistency occurs between 0 degrees and 360 degrees and thus, extracting a sine component and a cosine component and treating these as continuous quantities, as in quaternion, is useful for machine learning. Self-position is calculated from measurement results of odometry and LIDAR by Adaptive Monte Carlo Localization (AMCL) of a robot OS.

Figure 8:
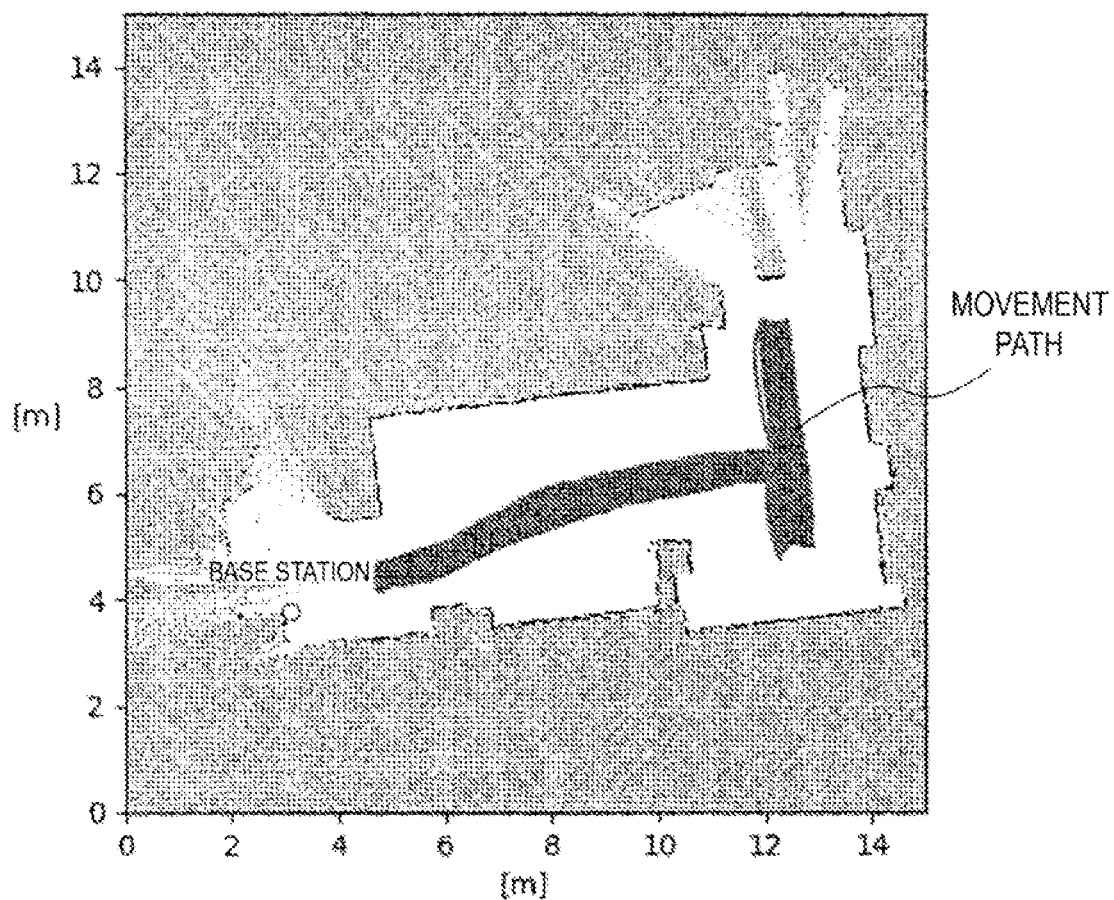
FIG. 8 illustrates map information of an indoor environment in which a demonstration experiment has been performed in the mobile terminal according to the present invention.

FIG. 8 illustrates map information of an indoor environment in which a demonstration experiment was performed. The map information includes a mobile route along which the mobile terminal 1 has moved, and a position of an external base station with which the mobile terminal 1 performs wireless communication. The mobile terminal 1 automatically operates in a substantially L-shaped space of approximately 10 m×4 m, generates terminal information, and measures communication quality. Here, a data transfer rate (throughput), which is an amount of arrival bits measured for one second, is used as the communication quality information.

Figure 9:
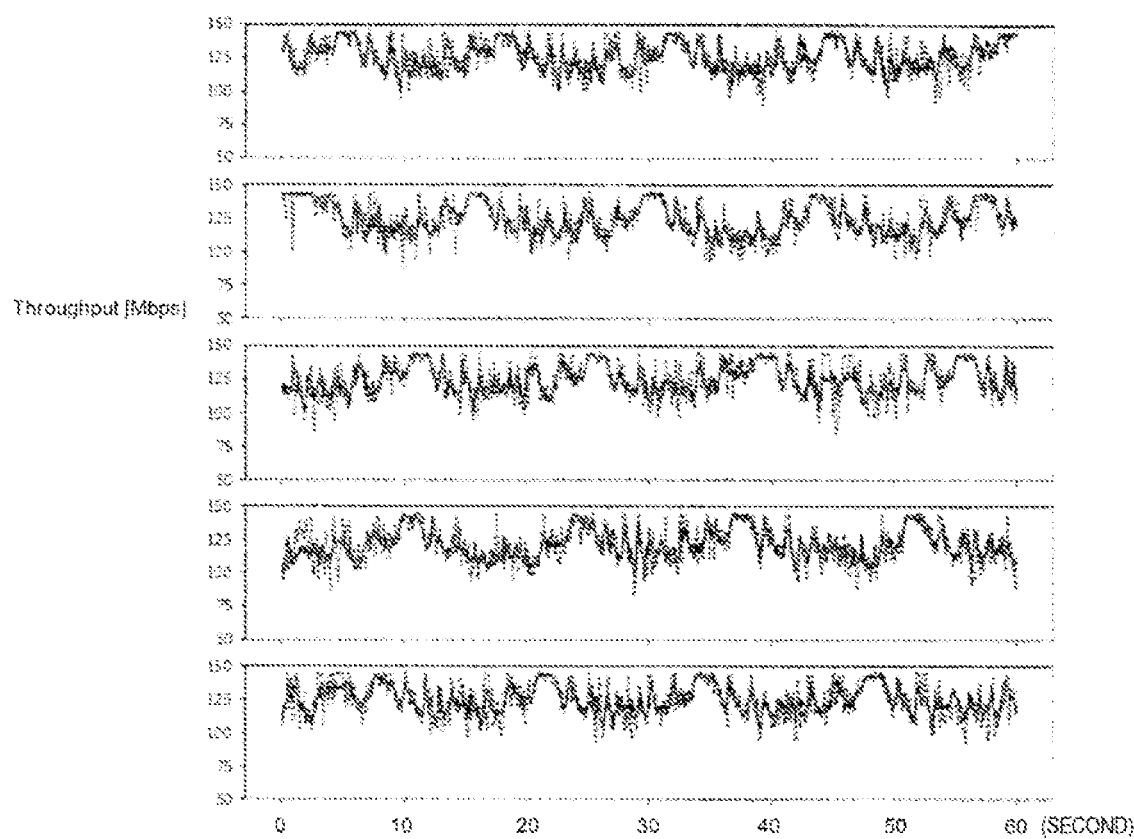
FIG. 9 is a diagram illustrating effects of the mobile terminal according to the present invention.

FIG. 9 illustrates extraction of a result of the mobile terminal 1 performing the first communication quality prediction for about 2600 seconds. The communication quality learning unit 1-5 used a random forest as machine learning (the number of decision trees is 500, and a k-fold cross learning method). Here, the communication quality information acquired by the communication quality evaluation unit 1-4 was divided into 10 parts, 9/10 of which was used for learning, and the remaining 1/10 was used for comparison with the communication quality predicted from the terminal information. The communication quality information was learned and predicted with data of the terminal information after one second.

A horizontal axis in FIG. 9 indicates time, and a vertical axis indicates a throughput. A dotted line in FIG. 9 indicates the actually measured value of the communication quality, and a solid line indicates a predicted value when the terminal information up to one second ago has been used. In FIG. 9, it can be confirmed that the predicted value follows the actually measured value, and the mobile terminal 1 performs prediction of the communication quality after one second from the terminal information.

A decision coefficient $R^2$ was calculated for evaluation of the performance. The decision coefficient is obtained by normalizing a mean square error so that the performance of the model can be interpreted more effectively, and is expressed as follows.

[Math. 1]

$$R^2 = 1 - \frac{\sum_{i=1}^{n}(y^{(i)} - \hat{y}^{(i)})^2}{\sum_{i=1}^{n}(y^{(i)} - \mu_y)^2} \quad (1)$$

Here, $y^{(i)}$ denotes a bit arrival amount (throughput) for one second calculated every 0.2 seconds, $y^{(i)}$ with a hat subscript is a predicted value thereof, and $\mu_y$ is an average value of the throughput. Hereinafter, 16 feature quantities including X and Y coordinates of the mobile terminal, difference information (speed) of the X and Y coordinates, mobile terminal orientation parameters (z and w of quaternion; cos (θ/2) and sin (θ/2)), difference information (rotation speed) of orientation parameters, tire rotation speed of the mobile terminal, information obtained by mapping the tire rotation speed of the mobile terminal to X and Y coordinates of a two-dimensional map space, tire rotation difference information (rotation speed) of the mobile terminal, control command information in front and back directions of the mobile terminal, information obtained by mapping the control command information in the front and back directions of the mobile terminal to the X and Y coordinates of the two-dimensional map space, and rotation control command information of the mobile terminal are considered as the terminal feature quantities.

Using four past samples of these feature quantities, that is, 64 feature quantities [position/orientation/speed/control information set] corresponding to information from 0.8 seconds ago to the present time, and 4×5=20 feature quantities [plan information set] consisting of information up to after future 1.0 seconds (corresponding to five samples one second because data is obtained every 200 ms), and 2×6=12 feature quantities [communication information set] consisting of a throughput of past 1.2 seconds and an RSSI for four control commands (control command information in the front and back directions of the mobile terminal, information obtained by mapping the control command information in the front and back directions of the mobile terminal to the X and Y coordinates of the two-dimensional map space, and the rotation control command information of the mobile terminal) among these, a throughput after one second was predicted and the decision coefficient was calculated.

Obtained results are shown in the table of FIG. 10. The decision coefficient closer to 1 indicates that the prediction was performed with higher accuracy, and 0.788 was obtained in a case in which the largest number of % feature quantities were input. It is generally considered that, when 0.6 or more is obtained, modeling has been performed, and when 0.7 or more is obtained, good modeling has been performed, and it can be confirmed that the throughput one second ahead can be predicted.

From this point, when a case in which a future control command signal has been removed is considered, prediction performance is slightly lowered as 0.785. In an operation of a mobile robot this time, because the mobile robot operates along only a determined operation route illustrated in FIG. 8 according to the same rule, an effect of preempting the control command information is not so great. This is thought to be because similar control information tends to be always generated for a position or speed in many cases. However, in a practical use case, when a degree of freedom in a motion of the mobile terminal is high, for example, when a surrounding obstacle is moving or a mobile terminal moving in the same manner exists in the surroundings, a control command for braking of the mobile terminal has a more significance and it can be predicted that an effect of improving the communication quality prediction performance will be greater.

Next, when a result of using only a position/orientation/speed/control information set corresponding to a case in which the communication quality information is not used and, conversely, a result of using only past communication quality information is considered, the decision coefficients were 0.692 and 0.671, respectively. It can be confirmed that the prediction performance is higher when the communication quality information has not been used at all and only the control information of the terminal has been used than when the prediction is performed from the past communication quality information. There is a method of the related art for predicting the future only from information on communication quality, but a result thereof shows that communication quality can be predicted only from information on position/orientation/speed/control without such information. This shows that it is possible to predict the communication quality in a case in which communication is started from now on without regularly confirming the communication quality, and it can be said that the availability of the communication quality prediction according to the present invention is enhanced.

Figure 11:
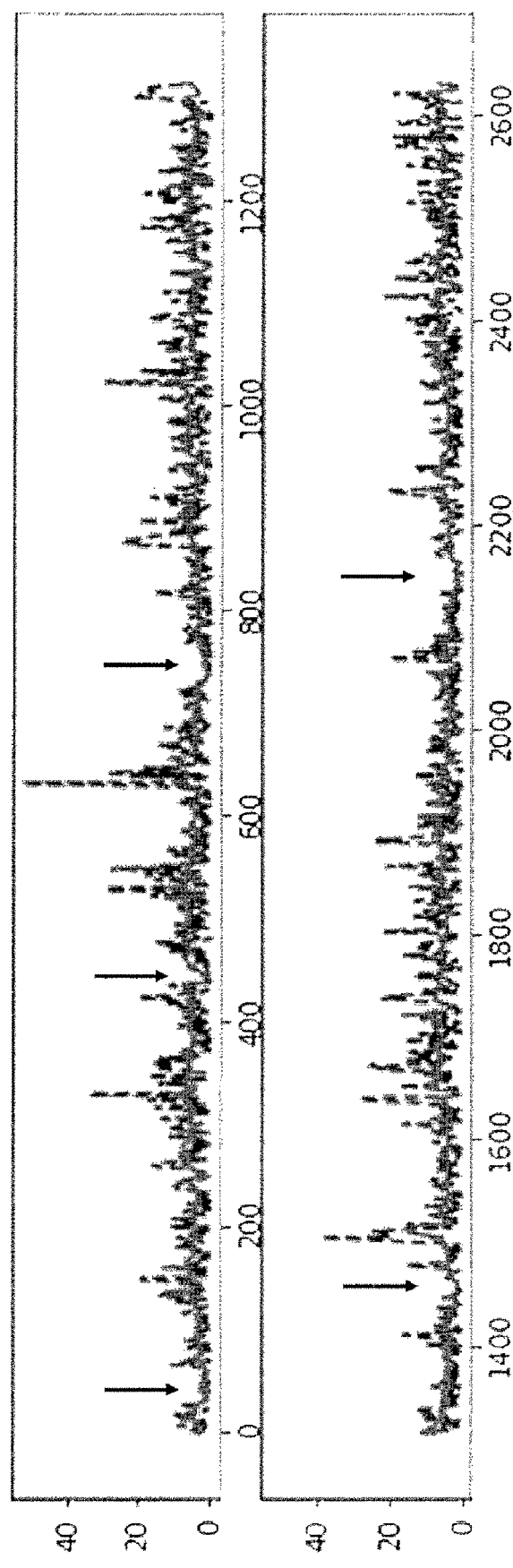
FIG. 11 is a diagram illustrating effects of the mobile terminal according to the present invention.

FIG. 11 illustrates a plot of a predicted prediction deviation and an actually measured prediction deviation when prediction of the prediction deviation has been performed. A dotted line indicates the actually measured prediction deviation value, and a solid line is the predicted prediction deviation value. A value on a horizontal axis is the number of samples and is 200 ms per sample. This is a result of using all % feature quantities as feature quantities for prediction, modeling a prediction deviation between a prediction result and the actually measured value with the same % feature quantities, and predicting the prediction deviation with % feature quantities up to one second ago. The prediction deviation was evaluated as an absolute value of a difference from the actually measured value. When the evaluation is performed with the decision coefficient described above, 0.132 is obtained, and it cannot be said that the modeling has been performed. However, as can be seen from confirmation of a diagram of FIG. 11, a large error is less likely to occur in time when the prediction deviation is determined to be low. For example, a low prediction deviation is output in a time indicated by an arrow in FIG. 11, and no large deviation occurs in the actually measured value. For example, when there is a high demand for prediction performance of communication quality, the mobile terminal can be operated for a condition of the feature quantity when the predicted value of the prediction deviation becomes small. Further, it is possible to further improve the accuracy of the estimation of the prediction deviation by averaging in a time direction. In an example of this experiment, FIG. 11 illustrates a result of modeling an absolute value of an expected deviation with respect to a throughput for one second and performing the prediction, but when modeling is performed with an average value of the predicted deviation for past 3 seconds, it is confirmed that 0.141 is obtained with the decision coefficient and the prediction performance becomes high.

OTHER EMBODIMENTS

The terminal in the above-described embodiment may be realized by a computer. In this case, the terminal may be realized by recording a program for realizing each component of each apparatus on a computer-readable recording medium, loading the program recorded on the recording medium into a computer system, and executing the program. The "computer system" described herein includes an OS or hardware such as a peripheral device. Further, the "computer-readable recording medium" refers to a portable medium such as a flexible disk, a magneto-optical disc, a ROM, or a CD-ROM, or a storage device such as a hard disk built into the computer system. Further, the "computer-readable recording medium" may also include a recording medium that dynamically holds a program for a short period of time, like a communication line in a case in which the program is transmitted over a network such as the Internet or a communication line such as a telephone line, or a recording medium that holds a program for a certain period of time, like a volatile memory inside a computer system serving as a server and a client in that case. Further, the above program may be a program for realizing some of the above-described components, may be a program that can realize the above-described components in combination with a program already recorded in the computer system, or may be a program realized by using hardware such as a programmable logic device (PLD) or field programmable gate array (FPGA).

Although the embodiments of the present invention have been described in detail with reference to the drawings, a specific configuration is not limited to the embodiments, and includes designs or the like without departing from the gist of the present invention.

REFERENCE SIGNS LIST

1 Mobile terminal
1-0 Apparatus network
1-1-1 to 1-1-*j* Communication unit
1-2 Terminal information generation unit
1-3 Communication prediction unit
1-4 Communication evaluation unit
1-5 Communication quality learning unit
1-6 Prediction deviation learning unit

The invention claimed is:

1. A mobile terminal for performing wireless communication, comprising:
   a processor; and
   a storage medium having computer program instructions stored thereon, when executed by the processor, perform to:
   measure communication quality of the wireless communication;
   generate terminal information consisting of at least one or more of a position, a posture, a motion, control information, camera and sensor information, and past communication information of the mobile terminal;
   generate a communication quality model from the terminal information and the measured communication quality of the wireless communication using machine learning, thereby learning a relationship between communication quality of the wireless communication and the terminal information to predict communication quality from current terminal information;
   estimate communication quality using the communication quality model;
   determine an error between the measured communication quality and the estimated communication quality from the communication quality model;
   generate a prediction deviation model from the terminal information and the error between the measured communication quality and the estimated communication quality using machine learning, thereby learning a relationship between the error and the terminal information to predict the error between the measured communication quality and the estimated communication quality from current terminal information; and
   estimate the error between the measured communication quality and the estimated communication quality us the prediction deviation model.

2. The mobile terminal according to claim 1, wherein the computer program instructions further perform to
   evaluate the communication quality to generate communication quality information together with time information corresponding to the communication quality; and
   learn a relationship between the communication quality and the terminal information to generate the communication quality model, and
   generates the terminal information together with the corresponding time information.

3. The mobile terminal according to claim 1, wherein the terminal information further includes information on an orientation of the mobile terminal, and a sine component and a cosine component of an angle are used as the orientation information.

4. The mobile terminal according to claim 1, wherein the terminal information includes at least a control plan corresponding to a future operation of the mobile terminal.

5. A communication quality prediction method for predicting wireless communication quality, comprising:
   measuring communication quality of the wireless communication;
   generating terminal information consisting of at least one or more of a position, a posture, a motion, control information, camera and sensor information, and past communication information of a mobile terminal;
   generating a communication quality model from the terminal information and the measured communication quality of the wireless communication using machine learning, thereby learning a relationship between communication quality of the wireless communication and the terminal information to predict communication quality from current terminal information;
   estimating communication quality using the communication quality model;
   determining an error between the measured communication quality and the estimated communication quality from the communication quality model;

generating a prediction deviation model from the terminal information and the error between the measured communication quality and the estimated communication quality using machine learning, thereby learning a relationship between the error and the terminal information to predict the error between the measured communication quality and the estimated communication quality from current terminal information; and estimating the error between the measured communication quality and the estimated communication quality us the prediction deviation model.

\* \* \* \* \*